United States Patent
Bennett et al.

(10) Patent No.: US 6,441,779 B1
(45) Date of Patent: Aug. 27, 2002

(54) SYSTEM AND METHOD OF CARRIER-PHASE ATTITUDE DETERMINATION

(75) Inventors: Sidney M. Bennett, Chicago, IL (US); Ronald Paradis, Fall River, MA (US)

(73) Assignee: KVH Industries, Inc., Middleton, RI (US)

(*) Notice: Subject to any disclaimer, the term of this patent is extended or adjusted under 35 U.S.C. 154(b) by 0 days.

(21) Appl. No.: 09/607,865

(22) Filed: Jun. 30, 2000

Related U.S. Application Data
(60) Provisional application No. 60/142,304, filed on Jul. 2, 1999.

(51) Int. Cl.[7] ............................................. H40B 7/185
(52) U.S. Cl. .................. 342/357.11; 342/354; 342/359; 342/365; 342/174; 701/214; 701/215; 434/112
(58) Field of Search ..................... 701/215, 214, 701/4, 3, 220, 221; 342/357.11, 357, 359, 174, 360, 365, 354; 434/112

(56) References Cited

U.S. PATENT DOCUMENTS

| | | | |
|---|---|---|---|
| 4,428,053 A | 1/1984 | Tol | 364/457 |
| 5,101,356 A | 3/1992 | Timothy et al. | 364/449 |
| 5,379,045 A * | 1/1995 | Gilbert et al. | 342/357 |
| 5,455,592 A * | 10/1995 | Huddle | 342/359 |
| 5,534,875 A * | 7/1996 | Diefes et al. | 342/357 |
| 5,917,444 A * | 6/1999 | Loomis et al. | 342/357 |
| 6,005,514 A * | 12/1999 | Lightsey | 342/365 |

FOREIGN PATENT DOCUMENTS

| | | |
|---|---|---|
| JP | 11 023686 | 1/1999 |
| WO | WO 00/22452 | 4/2000 |

* cited by examiner

Primary Examiner—William A. Cuchlinski, Jr.
Assistant Examiner—Tuan C To
(74) Attorney, Agent, or Firm—Foley Hoag, LLP

(57) ABSTRACT

A system and a method for determining a satellite antenna attitude are disclosed. Radio signals from a satellite, such as a GPS satellite, are received by a plurality of coupled antenna elements forming an antenna array. Local attitude values of the antenna array and/or the antenna elements with respect to a reference plane are determined using a shaft encoder or gyro, whereas a carrier-phase antenna attitude is determined from the received radio signals. The array and/or array elements are rotated over a predetermined angle and a correction value of the antenna attitude is determined from a time-averaged difference between the local attitude values and the carrier-phase attitude values.

29 Claims, 5 Drawing Sheets

SYSTEM AND METHOD OF CARRIER-PHASE ATTITUDE DETERMINATION

CROSS REFERENCE TO RELATED APPLICATION

This application claims the benefit of Provisional Application No. 60/142,304, filed Jul. 2, 1999.

FIELD OF THE INVENTION

This application relates to satellite navigation systems, and more particularly to determining a satellite antenna attitude with an antenna array having multiple antennas.

BACKGROUND OF THE INVENTION

Antenna configurations for GPS receivers can include either a single antenna which can be controlled to point in different directions, or multiple antennas in the form of a linear or a two-dimensional array. Antenna arrays may have the advantage of having fewer, if any, moving parts. The attitude of an antenna array may be measured by determining a phase difference between the various antenna elements of radio signals received from a GPS satellite. The antenna elements are typically spaced apart at regular intervals. If the spacing or baseline between the antenna elements is less than half the radio wavelength of the signals, then the surface in angle space along which the signal must lie can be determined unambiguously. This determination can be made for more than one GPS satellite visible in the sky, with the intersection of the surfaces defining the orientation of the antenna array with respect to the datum. The accuracy of the attitude measurement increases with increasing distance between the array antenna elements (baseline) due, for example, to the improved signal-to-noise ratio and improvement in other non-ideal properties of the antenna array. When the antenna baseline is greater than half a wavelength of the GPS satellite carrier frequency, the solution becomes ambiguous, as is known in the art. Since the position of each GPS satellite is accurately known relative to the Earth's coordinate frame, as is known in the art the GPS receiver can accurately locate the position in three-dimensional coordinate space using a single antenna, and only the attitude is determined from the carrier-phase interferometry. The ambiguities are resolved by ensuring that the order N of the ambiguity for each baseline and GPS satellite yields a solution consistent with the known positions of the GPS satellites at any instant in time.

The attitude of the antenna array relative to a signal source such as a satellite can be determined with sufficient accuracy if the phase delay between a signal incident on an antenna element of the antenna array and the receiver is substantially independent of the angle at which the signal is received. As is known in the art, however, antenna element measurements do exhibit some angle-dependent variations in phase delay. While such variations, which will also be referred to herein as phase center errors, are typically relatively small, and do not ordinarily prevent ambiguities from being resolved, they may still cause errors in the attitude determination, particularly for small baselines. One source of variation is the antenna itself. Practical antennas and antenna elements have a phase response that is a function of elevation and azimuth. For a stationary antenna or antenna array, as the satellite moves in space, the angle of incidence of the radio wave changes with respect to the antenna coordinates, introducing a phase error in the measurement which corresponds to an error in angle. Although this error has been discussed for a single satellite and a single antenna pair, it can be generalized to apply to multiple satellites and multiple antenna pairs. Depending on the orientation of the antenna array, the effects will differ in the pitch, roll and yaw axes. Since the satellites are in motion with respect to a fixed antenna, the angle-dependent error of the antenna array will result in a time-dependent error in the angle measurement and consequently also in the antenna attitude determination.

The angle measurement error is composed of at least two components: (i) short-time period fluctuations in the signal due to electrical noise, and (ii) a phase center error of the antennas as a function of angle of incidence of the radio wave received from the satellite. The first, short-time noise can be characterized as a first order Markov process (low-pass filtered white noise). This error can be reduced by averaging the measurements over a predetermined time period, for example, over several seconds. The averaging time will depend on the change of the relative angular position of the satellite with time and the antenna characteristics, since the satellite should be substantially stationary during the averaging time. The second error, due to the phase center errors can be shown experimentally to have a periodicity of the order of the sidereal day, since the pattern of satellite motions repeats. Accordingly, in order to eliminate the phase center error, the carrier-phase attitude could be measured over a sidereal day, which is not practical. The error in angle estimate therefore may not approach a theoretical antenna resolution for antenna arrays having a relatively short baseline of approximately 2–10 meters.

It would therefore be desirable to provide a system and a method for correcting the effects due to phase center errors, in particular, but not solely, of antenna arrays used in static applications, such as the determination of the orientation of a platform with respect to True North for tactical spotting scopes and/or orientation of artillery.

The invention relates to methods and systems for determining the attitude of an antenna array.

According to one aspect of the invention, a method of determining a satellite antenna attitude comprises providing a plurality of coupled antenna elements, which receive radio signals from a satellite, changing an orientation of the plurality of elements with respect to a reference plane over a predetermined angle, locally monitoring the orientation of the plurality of elements, calculating a difference between the locally monitored orientation with respect to the reference plane and the attitude determined from the received satellite radio signals as the orientation of the plurality of elements is changed; computing an average of the difference; and correcting the attitude of the plurality of elements based on the average. The average may be a time average. The orientation of the plurality of elements may be locally monitored using an encoder, a shaft encoder or a gyro. The plurality of elements may be mounted on a common platform, with the antenna elements having a common orientation with respect to one another, and the orientation of the plurality of elements with respect to a reference plane being adjusted by adjusting the orientation of the common platform. The coupled elements may include a substantially linear array or a substantially two-dimensional array.

According to another aspect of the invention, a system for determining a satellite antenna attitude comprises a plurality of coupled antenna elements receiving radio signals from a satellite, a receiver which receives antenna signals from the coupled elements and determines a phase relationship between the radio signals received by the plurality of coupled elements, a local attitude monitoring device which monitors an orientation of the plurality of coupled elements with respect to a reference plane, and a processing device which receives from the local attitude monitoring device a first signal corresponding to the orientation of the plurality of elements with respect to the reference plane and which receives from the receiver a second signal corresponding to the phase relationship, wherein a direction of the plurality of elements with respect to a position of the satellite is changed over a predetermined angle and a correction value of the attitude of the plurality of elements is determined from an averaged difference between the first and second signal. The averaged difference may be a time-averaged difference. A drive means coupled to at least a portion of the plurality of elements and adapted to adjust the orientation of the plurality of elements with respect to the reference plane may be utilized. The local attitude monitoring device may be an encoder, shaft encoder, or gyro. The processing device may include a filter. The plurality of elements may be mounted on a common platform, with the orientation of the plurality of elements with respect to a reference plane being adjusted by adjusting the orientation of the common platform or by adjusting the orientation of the individual elements. The coupled elements may include a substantially linear array or a substantially two-dimensional array.

According to another aspect of the invention, a method of determining a satellite antenna attitude comprises: providing a plurality of coupled antenna elements having an attitude, the antenna elements receiving radio signals from a satellite, calculating an antenna attitude using a phase relationship of the radio signals received by the coupled antenna elements, changing an orientation of at least two of the plurality of coupled antenna elements with respect to a reference plane over a predetermined angle in a synchronized manner, calculating further antenna attitudes using the phase relationship of the radio signals received by the coupled antenna elements as the orientation of at least two of the plurality of coupled antenna elements is changed; and computing an average of the antenna attitudes thus calculated. The changing of the orientation of at least two of the plurality of coupled antenna elements with respect to the reference plane over the predetermined angle may comprise rotating at least two of the plurality of coupled antenna elements about their respective axes of symmetry. The coupled antenna elements may include a substantially linear array or a substantially two-dimensional array.

According to another aspect of the invention, a system for determining a satellite antenna attitude comprises a plurality of coupled antenna elements having an attitude and receiving radio signals from a satellite, a receiver which receives antenna signals from the plurality of coupled antenna elements and determines a phase relationship between the radio signals received by at least two of the plurality of coupled antenna elements, and a processing device which receives from the receiver a signal corresponding to the phase relationship and calculates an antenna attitude therefrom, wherein an orientation of at least two of the plurality of coupled antenna elements with respect to a position of the satellite is changed over a predetermined angle in a synchronized manner and an attitude of the plurality of coupled antenna elements is determined from an average of the antenna attitudes calculated while the orientation is changed. The change in the orientation of at least two of the plurality of coupled antenna elements with respect to the position of the satellite may comprise rotating at least two of the plurality of coupled antenna elements about their respective axes of symmetry. The coupled antenna elements may include a substantially linear array, or a substantially two-dimensional array.

Further features and advantages of the present invention will be apparent from the following desrcription of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

Figure 1:
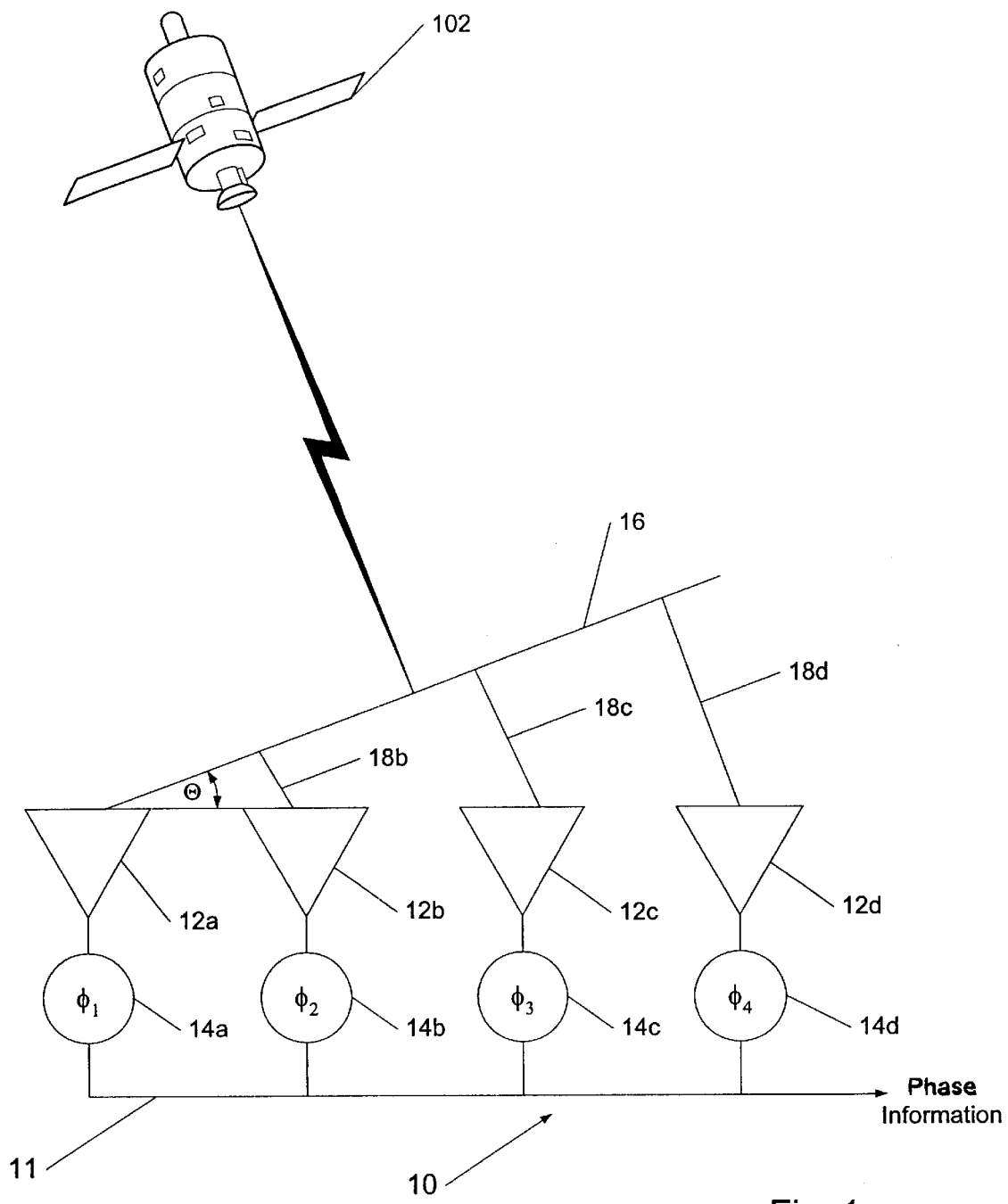
FIG. 1 is a schematic diagram of a phased array antenna.

Referring now to FIG. 1, an antenna array 10 receives electromagnetic signals from a satellite 102. For sake of simplicity, it will be assumed that the antenna array 10 is a linear array [12a, 12b, 12c, and 12d,] and that the azimuth of the satellite 102 is measured in a plane which contains [defined by] the elements of the linear array 12a, 12b, 12c, and 12d. Antenna arrays of this type are known in the art as phased array antennas. As mentioned above, if the baseline between adjacent antenna elements is less than half the radio wavelength of the satellite signal, then the surface in angle space along which the signal must lie can be determined unambiguously. For example, the angle Θ between the phase front 16 of radio waves emitted by the satellite 102 and an imaginary line connecting the antenna elements is determined by measuring the phase delays 18b (=$\phi_2-\phi_1$), 18c (=$\phi_3-\phi_1$), 18d (=$\phi_4-\phi_1$). The array can also be a two-dimensional array, in which case both the elevation and the azimuth of the satellite with respect to a reference direction can be determined. When the antenna or baseline is a greater than half a wavelength, there exists more than one surface along which the signal from each satellite can lie, and the solution is said to possess ambiguities. However, such ambiguities can be resolved by ensuring that the order N of the ambiguities for each baseline and GPS satellite yields a solution consistent with the known positions of the GPS satellite at any given time.

Figure 2:
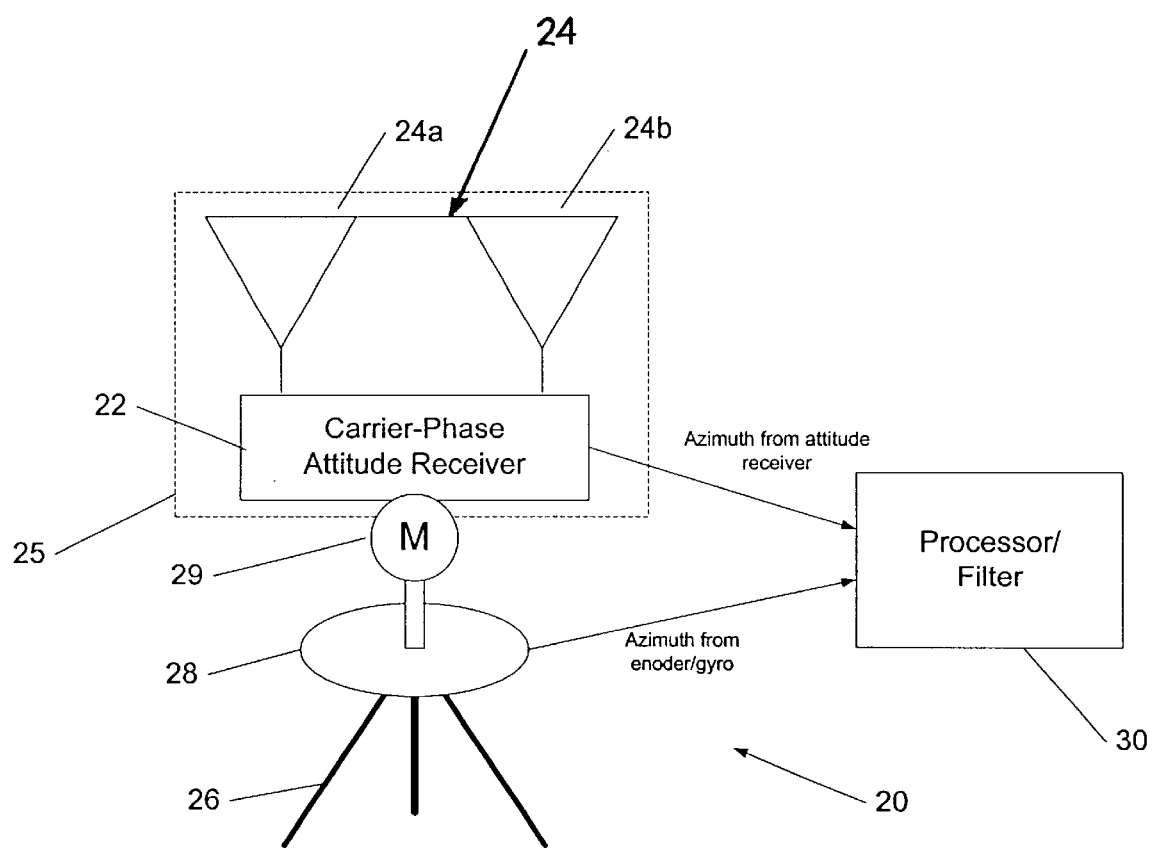
FIG. 2 is a first embodiment of a system for carrier-phase attitude determination according to the invention.

Referring now to FIG. 2, a system 20 for carrier-phase attitude determination according to the invention includes a carrier-phase attitude receiver system 25 with a receiver 22 and an antenna array 24 comprising at least two antenna elements exemplified by 24a and 24b, which may be a linear array or a two-dimensional array. Antenna elements in an array may be referred to herein as coupled antenna elements and it will be understood that this is not intended to suggest that the elements are directly electromagnetically coupled to each other. The attitude receiver system 25 may be mounted on a platform 26, shown here as a tripod, which may be stationary or mobile, for example, mounted on a land vehicle or a marine vessel. The platform 26 may further include an encoder, such as a shaft encoder, or gyroscope 28 coupled to the receiver system 25 for locally determining the attitude of the receiver system 25. As is known in the art, a shaft encoder 28 would measure the rotation of the receiver system 25 relative to the platform 26, while a gyroscope 28 would measure the rotation of the receiver system 25 relative to an inertial reference system; as discussed below these measurements would differ if the local platform were in motion. Also indicated schematically is a motor drive 29 capable of rotating [tilting] the system 25 with respect to the platform 26. A processor 30 receives signals from the shaft encoder or gyroscope 28 and the attitude receiver 22, respectively, that represent the orientation of the receiver system 25 in relation to a reference direction of the platform 26. As discussed below, this assumes that the platform is stationary; if the platform is moving a gyroscopic measurement can be used to correct for any rotation brought about by the motion. The processor 30 may include a filter, such as a Kalman filter, for filtering out noise.

Figure 4:
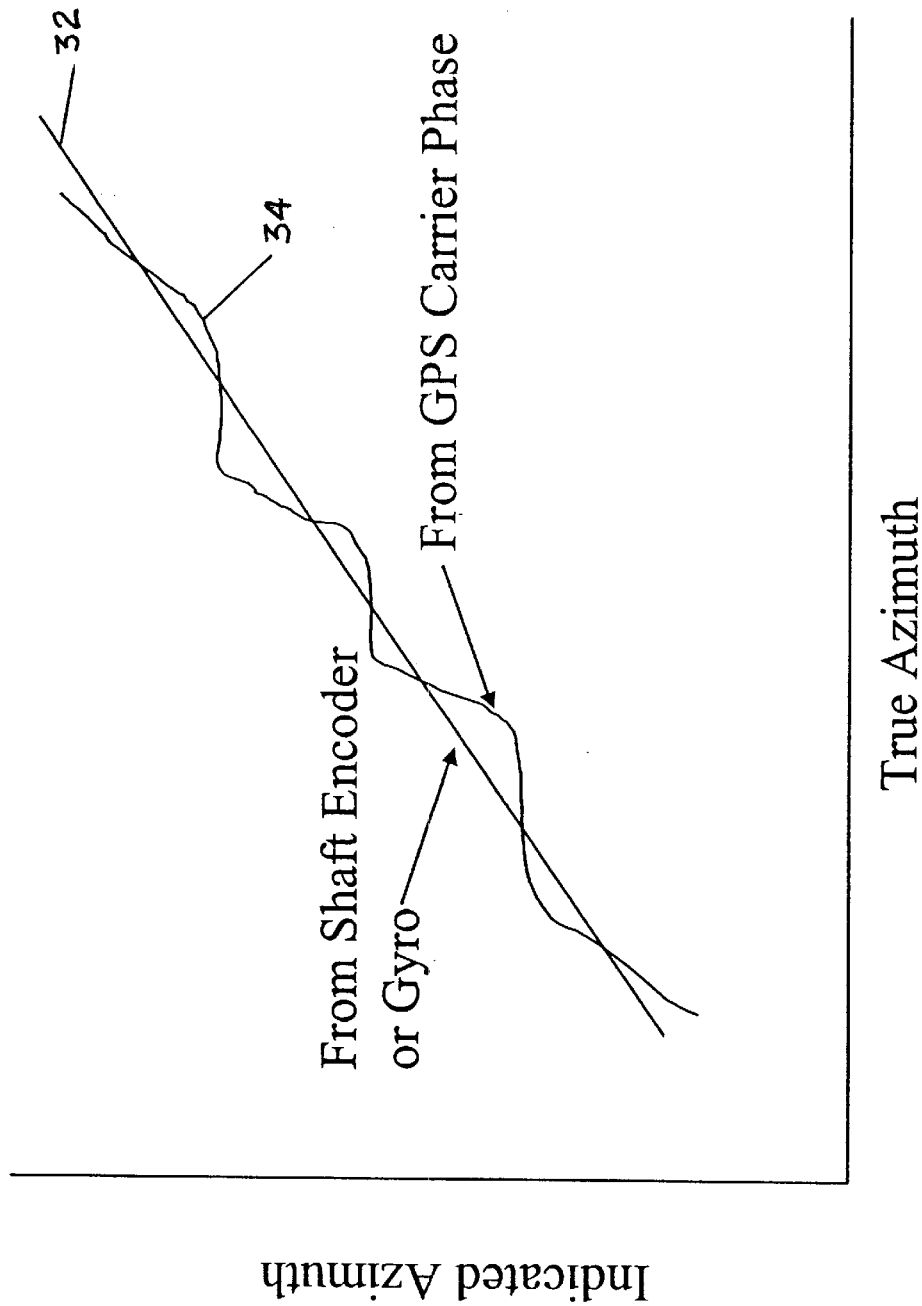
FIG. 4 shows schematically a correlation between the measured [phase angle] attitude using carrier-phase attitude determination and the [locally referenced] true attitude of an antenna platform.

With the antenna array 10, 24 being stationary with respect to a support surface 11, the antenna elements 12a, ..., 12d receive a signal from an orbiting satellite 102. GPS satellites typically have an orbital period of approximately 12 hours, corresponding to an apparent angular motion of the satellites of approximately 30°/hr. Ideally, i.e., if the antenna array 10, 24 does not have a phase error, the antenna attitude computed by the processor 30 based on the signals transmitted by the GPS satellite 102 and received by the receiver 22, as compared to the true attitude, would be represented by a straight line as illustrated in FIG. 4, and the computed antenna attitude would correspond to the true antenna attitude. However, the phase error of the antenna array 10, 24 will distort the signal and produce the exemplary oscillatory curve 34 of FIG. 4. Short-time noise has been omitted from the curves, since such noise is random and can be averaged by measuring the signal over a predetermined integration time period. The shape of the curve 34 depends on the wavelength of the radio signal emitted by the satellite and on the initial orientation (angle $\Theta$ of FIG. 1) of the receiver at the beginning of the satellite tracking interval. However, the relationship between the "ideal" curve and the measured curve 34 is deterministic.

The measurements of the attitude of the receiver system 25 taken with the shaft encoder and/or gyro 28 are essentially noise-free, except for quantization noise, which can be significantly reduced through proper design, as is known in the art. However, gyros tend to suffer from lack of long-term attitude stability and have to be adjusted and/or referenced periodically.

The change in the indicated azimuthal data with respect to an orbiting satellite 102 for an antenna array that is stationary over a time interval that corresponds to a predetermined change in the angle $\Theta$ (FIG. 1) is identical to a change in the indicated azimuthal data for an antenna that is rotated over the same angle $\Theta$ while the satellite remains in an approximately stationary reference position although as is known in the art in the case of the satellite motion there may also be a change in elevation angle. In other words, both data series represent the apparent azimuthal change (determined using the GPS carrier-phase process). The rate of change of azimuth should be limited when the array is rotated so that the data can be considered as having been taken by either process. It may be useful to either thin the data or weight the observation residuals such that the density of measurements is approximately uniform in measured azimuthal change. This approach may be useful when the actual antenna phase pattern and satellite locations are not known or used.

In practice, the antenna system 10 of FIG. 1 may be positioned at a fixed azimuth for a short period of time to obtain an initial azimuth estimate, and then rotated over an angular sector, which may substantially correspond to the expected observation period of the satellite. There is no need to return to the initial starting azimuth. As discussed below, the assumption is made that when the attitude as measured by the antenna array is subtracted from the attitude as measured by the shaft encoder or gyroscope the result of the rotation of the antenna array is a zero-mean average observation residual. Any fixed angular error in the measurement by the shaft encoder or gyroscope will manifest itself as a non-zero-mean average. If such a discrepancy is detected between the GPS carrier phase measurement and the attitude of the antenna array 10, 24 derived from the shaft encoder and/or gyro 28, then the shaft encoder and/or gyro 28 can be adjusted accordingly. Such a discrepancy may occur because as discussed above gyros tend to suffer from lack of long-term attitude stability and have to be adjusted and/or referenced periodically.

Since the attitude indicated by the shaft encoder 28 at any given time is deterministically related to the initial attitude, the attitude of the array 24 can be accurately determined and corrected for any azimuth using the shaft encoder. For a rotation of the antenna array 10, 24 at a uniform rate from a starting position $\Theta_1$ to $\Theta_1 + \Delta\phi$, and then optionally back again to $\Theta_1$, data series are generated. For the embodiment using a shaft encoder, the initial shaft encoder azimuth is set equal to the initial value $\Theta_1$ as determined by the carrier phase measurement. For each increment of $\Delta\Theta$ in the first data series, the difference is determined between the shaft encoder value and the GPS carrier-phase angle measurement. Since the true difference is assumed to have a zero-mean average, as discussed above, the mean of this measured difference can be interpreted as the error in the initial estimate of the azimuth angle, and the initial value $\Theta_1$, as determined by the carrier phase measurement can be adjusted accordingly. It is not necessary to return to the exact same azimuth $\Theta_1$ for this technique to be used. Instead, the difference between the shaft encoder azimuth value and the GPS-carrier phase azimuth can be viewed as an observation residual, and the original azimuth estimate adjusted using conventional filtering techniques, such as exponential averaging and/or Kalman filtering. Since the current position of the shaft encoder is deterministically related to the original position, the position of the array can now be accurately determined for any azimuth. The rotational rate of change of azimuth should be limited such that the data can be considered as having been taken by either process.

The angular measurement errors (the exemplary embodiment is described with reference to the azimuth, but elevation may also be included) of the GPS carrier-phase detection system are a complex function of the angle at which the array is oriented. The difference between the angular change measured by the shaft encoder and the angular change measured from the GPS carrier-phase, while not strictly random, tend to approach a zero-mean value if the rotation range of azimuth angles is sufficiently large. Since the small-scale errors in phase center have a rather fine scale angle dependence, a rotation of the antenna array of approximately 10° to 20° of total rotation may be sufficient.

Figure 5:
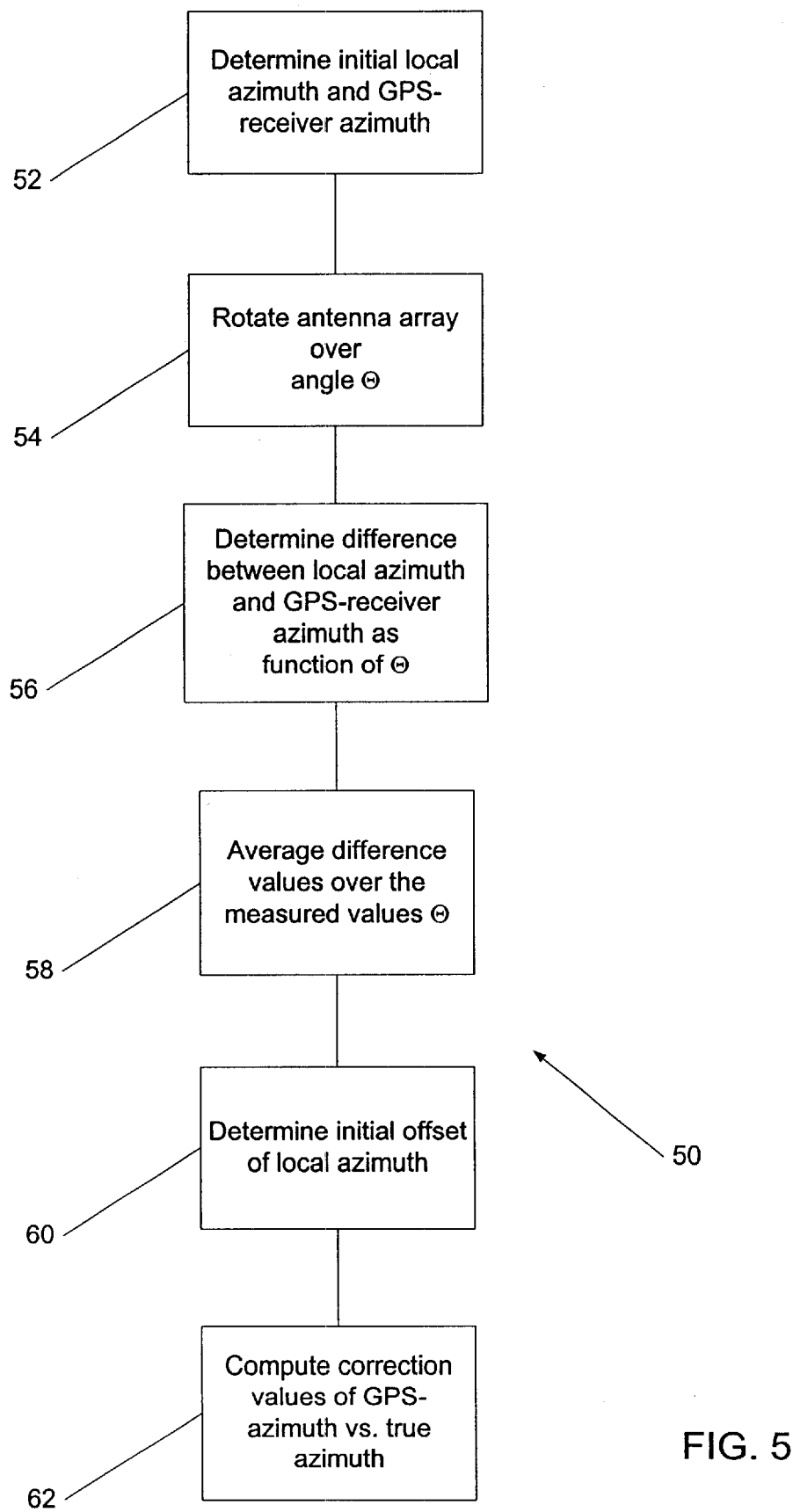
FIG. 5 is a flow diagram for a process for correlating the measured [phase angle] attitude using carrier-phase attitude determination and the locally [reference] determined attitude of the antenna platform and using the result.

A process 50 for determining a carrier phase attitude with a receiver configuration having multiple antennas is shown in FIG. 5. Initially, at step 52, the locally-determined azimuth and GPS receiver-determined azimuth are determined at approximately the same time. The locally determined azimuth is determined using, for example, a compass, a shaft encoder or a gyro, as described above. The GPS receiver-determined azimuth is determined based on radio signals received from a GPS satellite. These initial readings are recorded and the antenna array is subsequently rotated over a predetermined angle Θ, at step 54. As mentioned above this rotation is executed at a sufficiently slow rate so that the satellite can be considered as being stationary. A difference ΔΘ between the locally determined azimuth and determined azimuth by the GPS receiver is then recorded for a number of the values of the rotation angle Θ, at step 56, and these difference values ΔΘ are then averaged over the measurement range of Θ, at step 58. The average of the values ΔΘ is then interpreted as an initial offset of the local azimuth recorded at the beginning of the process 50, at step 60. The averaged values ΔΘ as a function of the rotation angle of the antenna array and/or the antenna elements can also be stored for example, in a memory (not shown) which may be part of the processor/filter 30 and used to correct the GPS receiver attitude readings for different angles of the antenna base 11 with respect to the location of the satellite 102, at step 62.

When used with a spotting scope, the pitch and roll of the antenna array can be determined by additional means, such as inclinometers or accelerometers. However, if the array is not horizontal, then the rotation sensed by the shaft encoder and the antenna array, will not strictly represent the yaw (azimuth) axis. This can be corrected by a simple coordinate transformation. In the event that the platform on which the system is mounted undergoes a more complex motion, such as may be the case when the system is mounted on the barrel of a military field gun, then the corrections may have to be made on a point-by-point basis.

The maximum speed of angular motion will depend on the rate at which the GPS carrier-phase system can compute the attitude estimates. A rate of 1°/sec may be adequate for a measurement accuracy of 0.1° at an output rate of 1°/sec. The rate can be based on the output of the shaft encoder, with faster data rates being ignored. If the rate at which the antenna array moved is relatively constant, then the rate can be increased while using an estimated position.

The system has been described for a situation where the system is fixed in one location. However, there may be need to move the system over a short distance after the azimuth angle has been determined. For example, the reception of the GPS signals at the observation location may be poor, for example, near a building or under a tree canopy, or the GPS receiver may experience interference or jamming. In another situation, where the support or tripod is moved to a new location, the assumption that the shaft encoder represents the azimuthal rotation of the antenna array is no longer valid, and a gyroscope in the yaw axis can be employed instead of the shaft encoder to locally monitor the antenna orientation. The initial angular position of the gyro can be established in the same manner as that of the shaft encoder, and the angular change determined by integrating the angular rate measured by the gyro. The data processing is analogous to that described above. If the system is moved over a short distance, the gyro will indicate the change in azimuth angle.

Alternatively or in addition, a magnetic compass may be used as a physical rotation reference. However, a magnetic compass may have a fixed angular error that will be manifest as a non-zero-mean average observation residual. The difference between the indicated angle from the magnetic compass and the GPS carrier-phase azimuth therefore cannot be used in the same manner as the angle derived from a gyro or a shaft encoder. An azimuthally dependent error of the magnetic compass can be modeled as a linear error over a restricted angular range and determined, for example, by using a least-mean-squares regression analysis extracting the mean and slope of the observation residual. The corrected data may them be processed in a manner similar to that described above. Alternatively, states in a Kalman filter can be allocated to the parameters. The antenna array may be rotated manually or by using a gear-reduction motor.

Figure 3:
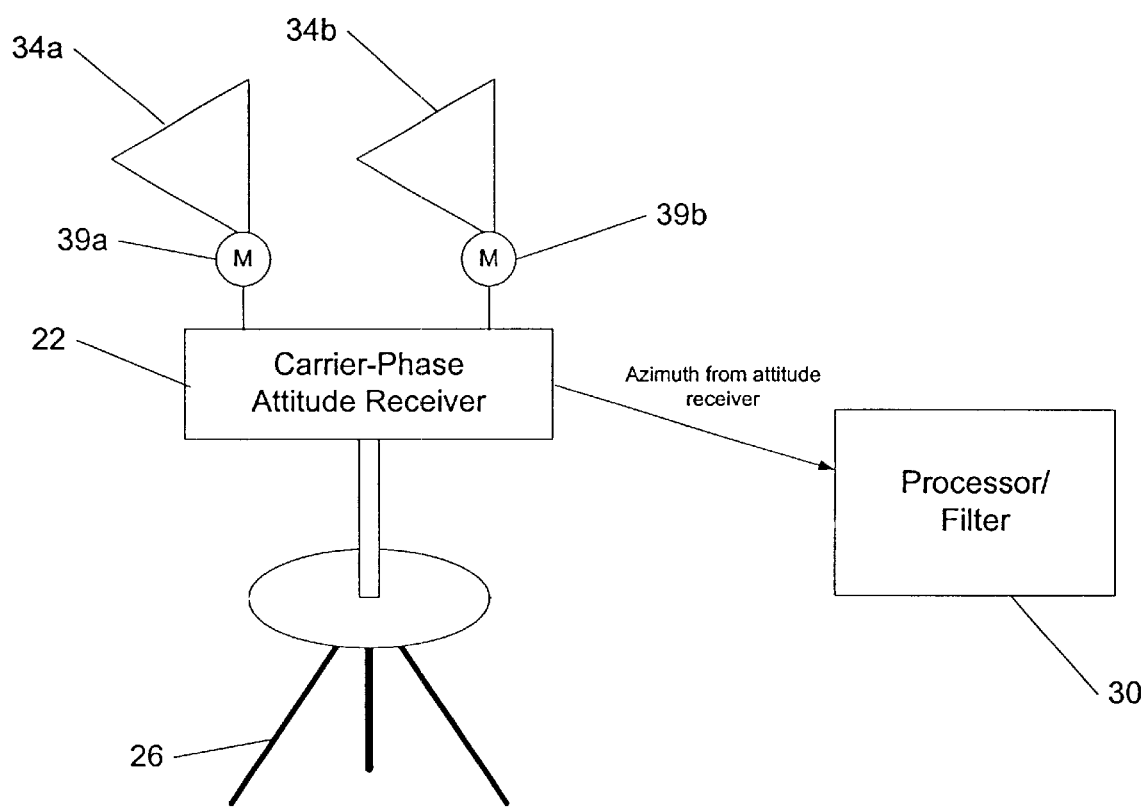
FIG. 3 is a second embodiment of a system for carrier-phase attitude determination according to the invention.

In an alternative embodiment 30 illustrated in FIG. 3, the baseline 11 (FIG. 1) of the antenna array exemplified by antennas 34a, 34b may remain fixed, while the antennas 34a, 34b themselves rotate about their respective nominal phase centers. The antennas may be controlled individually by motor drives 39a, 39b. In other aspects, the two embodiments depicted in FIGS. 2 and 3 operate in the same manner. As a result of the rotation of the antennas, the phase error introduced by the phase error pattern of each antenna varies with time due to the change in angle between the physical antennas and the satellite, as referenced to a coordinate system fixed relative to the antenna. Accordingly, any apparent change in the measured carrier-phase attitude angles is a result of an antenna phase center error. The magnitude of the angular rotation of each antenna may be substantially identical to the magnitude of the angular rotation of the array baseline in the first embodiment. The rotary joint or cable wrap is the most convenient means to obtain the angular rotations in practice with this technique. As in the first embodiment, the resultant difference time series is assumed to have a zero-mean value. Therefore, any non-zero mean value obtained can be ascribed to the difference between the initially assumed attitude and the actual attitude. The aforedescribed filtering (Kalman filter) and estimation techniques can also be employed. This approach has an additional advantage that the antennas can be rotated even if the equipment for which the system is provided is in use. To provide control over the rotation of the antennas about their respective axes, a small gear-reduction motor can be employed. As is known in the art, these motors will provide the same angular rotation if the same signal is input, and hence the antenna element rotations will be synchronized. Since the short time and average errors are presumed to be noise-like in nature, the rate of rotation of the antennas need not be synchronized, in which case the angle rotation of the individual antennas can be measured, as in the prior embodiment, using shaft encoders and/or gyros. If an additional antenna is provided to resolve ambiguities in the determination of the satellite attitude, then this antenna need not be rotated, unless the additional antenna is actually used in the measurement of the array attitude.

While the invention has been disclosed in connection with the preferred embodiments shown and described in detail, various modifications and improvements thereon will become ready the apparent to those skilled in the art. Accordingly, the spirit and scope of the present invention is to be limited only by the following claims.

We claim:

1. A method of determining a satellite antenna attitude, comprising:

providing a plurality of coupled antenna elements having an attitude, the antenna elements receiving radio signals from a satellite, changing an orientation of the plurality of coupled antenna elements with respect to a reference plane over a predetermined angle, locally monitoring the orientation of the plurality of coupled antenna elements, calculating a difference between the locally monitored orientation with respect to the reference plane and the attitude determined from the received satellite radio signals as a function of time;

computing a time average of the difference; and correcting the attitude of the plurality of coupled antenna elements based on the time average.

2. The method of claim 1, wherein the orientation of the plurality of coupled antenna elements is locally monitored using at least one of an encoder, a shaft encoder and a gyro.

3. A system for determining a satellite antenna attitude, comprising:

a plurality of coupled antenna elements having an attitude and receiving radio signals from a satellite, a receiver which receives antenna signals from the coupled antenna elements and determines a phase relationship between the radio signals received by the plurality of coupled antenna elements, a local attitude monitoring device which monitors an orientation of the plurality of coupled antenna elements with respect to a reference plane, and a processing device which receives from the local attitude monitoring device a first signal corresponding to the orientation of the plurality of coupled antenna elements with respect to the reference plane and which receives from the receiver a second signal corresponding to the phase relationship, wherein a direction of the plurality of coupled antenna elements with respect to a position of the satellite is changed over a predetermined angle and a correction value of the attitude of the plurality of coupled antenna elements is determined from a time-averaged difference between the first and second signal.

4. The system of claim 3, further comprising drive means coupled to at least a portion of the plurality of coupled antenna elements and adapted to adjust the orientation of the plurality of coupled antenna elements with respect to the reference plane.

5. The system of claim 3, wherein the local attitude monitoring device is at least one gyro.

6. The system of claim 3, wherein the processing device includes a filter.

7. The system of claim 3, wherein the plurality of coupled antenna elements is mounted on a common platform, with the antenna elements having a common orientation with respect to one another, and wherein the orientation of the plurality of coupled antenna elements with respect to a reference plane is adjusted by adjusting the orientation of the common platform.

8. The system of claim 3, wherein the plurality of coupled antenna elements is mounted on a common platform, with the orientation of the antenna elements being individually adjustable, and wherein the orientation of the plurality of coupled antenna elements with respect to a reference plane is adjusted by adjusting the orientation of the individual antenna elements.

9. A system for determining a satellite antenna attitude, comprising:

a plurality of coupled antenna elements having an attitude and receiving radio signals from a satellite, a receiver which receives antenna signals from the coupled antenna elements and determines a phase relationship between the radio signals received by the plurality of coupled antenna elements, a local attitude monitoring device which monitors an orientation of the plurality of coupled antenna elements with respect to a reference plane, and a processing device which receives from the local attitude monitoring device a first signal corresponding to the orientation of the plurality of coupled antenna elements with respect to the reference plane and which receives from the receiver a second signal corresponding to the phase relationship, wherein a direction of the plurality of coupled antenna elements with respect to a position of the satellite is changed over a predetermined angle and a correction value of the attitude of the plurality of coupled antenna elements is determined from a averaged difference between the first and second signal, wherein the local attitude monitoring device is at least one encoder.

10. The system of claim 9, wherein the encoder is a shaft encoder.

11. A method of determining a satellite antenna attitude, comprising:

providing a plurality of coupled antenna elements having an attitude, the antenna elements receiving radio signals from a satellite, changing an orientation of the plurality of coupled antenna elements with respect to a reference plane over a predetermined angle, locally monitoring the orientation of the plurality of coupled antenna elements, calculating a difference between the locally monitored orientation with respect to the reference plane and the attitude determined from the received satellite radio signals as the orientation of the plurality of coupled antenna elements is changed;

computing an average of the difference; and correcting the attitude of the plurality of coupled antenna elements based on the average.

12. The method of claim 11, wherein the plurality of coupled antenna elements is mounted on a common platform, with the antenna elements having a common orientation with respect to one another, and the orientation of the plurality of coupled antenna elements with respect to a reference plane is adjusted by adjusting the orientation of the common platform.

13. The method of claim 12, wherein the orientation of the plurality of coupled antenna elements is locally monitored using at least one of an encoder, a shaft encoder, and a gyro.

14. The method of claim 11, wherein the coupled antenna elements include a substantially linear array.

15. The method of claim 11, wherein the coupled antenna elements include a substantially two-dimensional array.

16. A method of determining a satellite antenna attitude, comprising:

providing a plurality of coupled antenna elements having an attitude, the antenna elements receiving radio signals from a satellite, calculating an antenna attitude using a phase relationship of the radio signals received by the coupled antenna elements, changing an orientation of at least two of the plurality of coupled antenna elements with respect to a reference plane over a predetermined angle in a synchronized manner, calculating further antenna attitudes using the phase relationship of the radio signals received by the coupled antenna elements as the orientation of at least two of the plurality of coupled antenna elements is changed; and computing an average of the antenna attitudes thus calculated.

17. The method of claim 16, wherein the changing of the orientation of at least two of the plurality of coupled antenna elements with respect to the reference plane over the predetermined angle comprises rotating at least two of the plurality of coupled antenna element about their respective axes of symmetry.

18. The method of claim 16, wherein the coupled antenna elements include a substantially linear array.

19. The method of claim 16, wherein the coupled antenna elements include a substantially two-dimensional array.

20. A system for determining a satellite antenna attitude, comprising:

a plurality of coupled antenna elements having an attitude and receiving radio signals from a satellite, a receiver which receives antenna signals from the coupled antenna elements and determines a phase relationship between the radio signals received by the plurality of coupled antenna elements, a local attitude monitoring device which monitors an orientation of the plurality of coupled antenna elements with respect to a reference plane, and a processing device which receives from the local attitude monitoring device a first signal corresponding to the orientation of the plurality of coupled antenna elements with respect to the reference plane and which receives from the receiver a second signal corresponding to the phase relationship, wherein a direction of the plurality of coupled antenna elements with respect to a position of the satellite is changed over a predetermined angle and a correction value of the attitude of the plurality of coupled antenna elements is determined from an averaged difference between the first and second signal.

21. The system of claim 20, wherein the coupled antenna elements include a substantially linear array.

22. The system of claim 20, wherein the coupled antenna elements include a substantially two-dimensional array.

23. The system of claim 20, wherein the plurality of coupled antenna elements is mounted on a common platform, with the antenna elements having a common orientation with respect to one another, and wherein the orientation of the plurality of coupled antenna elements with respect to a reference plane is adjusted by adjusting the orientation of the common platform.

24. The system of claim 23, wherein the local monitoring device is at least one of an encoder, a shaft encoder, and a gyro.

25. The system of claim 20, wherein the processing device includes a filter.

26. A system for determining a satellite antenna attitude, comprising:

a plurality of coupled antenna elements having an attitude and receiving radio signals from a satellite, a receiver which receives antenna signals from the plurality of coupled antenna elements and determines a phase relationship between the radio signals received by at least two of the plurality of coupled antenna elements, and a processing device which receives from the receiver a signal corresponding to the phase relationship and calculates an antenna attitude therefrom, wherein an orientation of at least two of the plurality of coupled antenna elements with respect to a position of the satellite is changed over a predetermined angle in a synchronized manner and an attitude of the plurality of coupled antenna elements is determined from an average of the antenna attitudes calculated while the orientation is changed.

27. The system of claim 26, wherein the change in the orientation of at least two of the plurality of coupled antenna elements with respect to the position of the satellite comprises rotating at least two of the plurality of coupled antenna elements about their respective axes of symmetry.

28. The system of claim 26, wherein the coupled antenna elements include a substantially linear array.

29. The system of claim 26, wherein in the coupled antenna elements include a substantially two-dimensional array.

* * * * *

UNITED STATES PATENT AND TRADEMARK OFFICE
CERTIFICATE OF CORRECTION

PATENT NO. : 6,441,779 B1  
DATED : August 27, 2002  
INVENTOR(S) : Sidney Bennett and Ronald Paradis It is certified that error appears in the above-identified patent and that said Letters Patent is hereby corrected as shown below:

Column 1,
Line 7, insert the following,
-- GOVERNMENT SUPPORT
   This invention was made with government support under Grant No. NOO178-99-C1047 awarded by the United States Department of the Navy, SBIR program. The Government may have certain rights in the invention. --

Signed and Sealed this

Twenty-second Day of June, 2004

JON W. DUDAS
*Acting Director of the United States Patent and Trademark Office*